(12) United States Patent
SooHoo et al.

(10) Patent No.: US 9,093,803 B2
(45) Date of Patent: Jul. 28, 2015

(54) PLUG CONNECTOR

(75) Inventors: Eric T. SooHoo, Sunnyvale, CA (US);
Ian P. Colahan, Menlo Park, CA (US);
Michael J. Webb, Scotts Valley, CA
(US); Eric S. Jol, San Jose, CA (US);
Paul J. Thompson, San Francisco, CA
(US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 13/610,777

(22) Filed: Sep. 11, 2012

(65) Prior Publication Data

US 2014/0073193 A1 Mar. 13, 2014

Related U.S. Application Data

(60) Provisional application No. 61/698,538, filed on Sep. 7, 2012.

(51) Int. Cl.
*H01R 13/04* (2006.01)
*H01R 24/00* (2011.01)
*G06F 1/16* (2006.01)
(Continued)

(52) U.S. Cl.
CPC .............. *H01R 23/00* (2013.01); *G06F 1/1626* (2013.01); *G06F 1/1632* (2013.01); *H01R 13/516* (2013.01); *H01R 13/73* (2013.01);
(Continued)

(58) Field of Classification Search
CPC .. H01R 23/00; H01R 13/516; H01R 13/6658; H01R 13/73; H01R 24/62; H04M 1/0274; H04M 1/04; G06F 1/1632; G06F 1/1626
USPC ..................... 439/108, 374, 607.35, 660, 693
See application file for complete search history.

(56) References Cited

U.S. PATENT DOCUMENTS 2,380,994 A 8/1945 Pummill
2,564,029 A 8/1951 Petersen
(Continued)

FOREIGN PATENT DOCUMENTS

CN 1397804 2/2003
CN 1830122 A 9/2006
(Continued)

OTHER PUBLICATIONS

International Search Report and Written Opinion for International PCT Application No. PCT/US2013/037233, mailed on Oct. 1, 2013, 14 pages.
(Continued)

*Primary Examiner* — Khiem Nguyen
(74) *Attorney, Agent, or Firm* — Kilpatrick Townsend & Stockton LLP

(57) ABSTRACT

Disclosed are plug connector assemblies having external contacts formed on only one surface of a connector body of the assembly. In some embodiments, the connector body includes a plastic tip integrally formed within a ground ring that is otherwise made from metal. Additionally, in some embodiments, the plug connector has a base portion with feet on opposing sides of the plug that each includes a hole that can be used to attach the plug connector to an encasing or other structure of a base electronic device it is incorporated into. In some embodiments, the plug connector extends upwardly away from the base at a predetermined angle such that the contacts are located on the side of the plug connector that forms an acute angle with the base.

21 Claims, 5 Drawing Sheets

(51) Int. Cl.
   *H01R 13/516*   (2006.01)
   *H01R 13/73*    (2006.01)
   *H04M 1/02*     (2006.01)
   *H04M 1/04*     (2006.01)
   *H01R 24/62*    (2011.01)
   *H01R 13/66*    (2006.01)

(52) U.S. Cl.
   CPC ............ *H01R 24/62* (2013.01); *H04M 1/0274* (2013.01); *H04M 1/04* (2013.01); *H01R 13/6658* (2013.01)

(56) References Cited

U.S. PATENT DOCUMENTS

| | | |
|---|---|---|
| 2,564,550 A | 8/1951 | Tichenor |
| 2,792,557 A | 5/1957 | Dowick |
| 2,892,990 A | 6/1959 | Werndl |
| 3,760,335 A | 9/1973 | Roberts |
| 3,793,614 A | 2/1974 | Tachick et al. |
| 3,795,037 A | 3/1974 | Luttmer |
| 4,361,375 A | 11/1982 | Bailey et al. |
| 4,558,912 A | 12/1985 | Coller et al. |
| 4,621,882 A | 11/1986 | Krumme |
| 4,711,506 A | 12/1987 | Tanaka |
| 5,040,994 A | 8/1991 | Nakamoto et al. |
| 5,256,074 A | 10/1993 | Tan |
| 5,295,843 A | 3/1994 | Davis et al. |
| 5,380,179 A | 1/1995 | Nishimura et al. |
| 5,380,225 A | 1/1995 | Imaoka |
| 5,387,110 A | 2/1995 | Kantner et al. |
| 5,413,442 A | 5/1995 | Grey |
| 5,442,243 A | 8/1995 | Bailey |
| 5,518,421 A * | 5/1996 | Davis ................ 439/607.5 |
| 5,554,042 A | 9/1996 | Denninger |
| 5,594,284 A | 1/1997 | Hill et al. |
| 5,785,557 A | 7/1998 | Davis |
| 5,959,848 A | 9/1999 | Groves et al. |
| 5,967,723 A | 10/1999 | Duran |
| 5,967,833 A | 10/1999 | Cachina |
| 6,074,225 A | 6/2000 | Wu et al. |
| 6,086,421 A | 7/2000 | Wu et al. |
| 6,113,427 A | 9/2000 | Wu |
| 6,179,627 B1 | 1/2001 | Daly et al. |
| 6,231,396 B1 | 5/2001 | Huang |
| 6,322,394 B1 | 11/2001 | Katoh et al. |
| 6,364,699 B1 | 4/2002 | Hwang et al. |
| 6,410,857 B1 | 6/2002 | Gonya |
| 6,482,028 B2 | 11/2002 | Kumamoto et al. |
| 6,482,045 B2 | 11/2002 | Arai |
| 6,488,520 B1 | 12/2002 | Hayes et al. |
| 6,530,793 B2 | 3/2003 | Eichhorn et al. |
| 6,692,311 B1 | 2/2004 | Kamei et al. |
| 6,716,058 B2 * | 4/2004 | Youn ................ 439/535 |
| 6,776,665 B2 | 8/2004 | Huang |
| 6,786,763 B2 | 9/2004 | Wu |
| 6,846,202 B1 | 1/2005 | Schmidt et al. |
| 6,869,320 B2 | 3/2005 | Haas et al. |
| 6,902,432 B2 | 6/2005 | Morikawa et al. |
| 6,948,965 B2 | 9/2005 | Kumamoto et al. |
| 6,948,983 B1 | 9/2005 | Peng |
| 6,948,984 B2 | 9/2005 | Chen et al. |
| 6,962,510 B1 | 11/2005 | Chen et al. |
| 6,964,582 B2 | 11/2005 | Zhuang et al. |
| 6,981,887 B1 | 1/2006 | Mese et al. |
| 6,994,575 B1 * | 2/2006 | Clark et al. ................ 439/173 |
| 7,021,971 B2 | 4/2006 | Chou et al. |
| 7,040,919 B2 | 5/2006 | Yao |
| 7,074,052 B1 | 7/2006 | Ni et al. |
| 7,094,086 B2 | 8/2006 | Teicher |
| 7,094,089 B2 | 8/2006 | Andre et al. |
| 7,160,125 B1 | 1/2007 | Teicher |
| 7,175,444 B2 | 2/2007 | Lang et al. |
| 7,192,313 B2 * | 3/2007 | Sai ................ 439/660 |
| 7,198,522 B1 | 4/2007 | Ho et al. |
| 7,249,978 B1 | 7/2007 | Ni |
| 7,361,059 B2 | 4/2008 | Harbarki et al. |
| 7,363,947 B2 | 4/2008 | Teicher |
| 7,364,445 B1 | 4/2008 | Ni et al. |
| 7,387,539 B2 | 6/2008 | Trenne |
| 7,396,257 B2 | 7/2008 | Takahashi |
| 7,407,416 B1 | 8/2008 | Rogers et al. |
| 7,435,107 B2 | 10/2008 | Matsumoto et al. |
| 7,440,286 B2 | 10/2008 | Hiew et al. |
| 7,442,091 B2 | 10/2008 | Salomon et al. |
| 7,458,825 B2 | 12/2008 | Atsmon et al. |
| 7,500,861 B2 | 3/2009 | Harbarki et al. |
| 7,537,471 B2 | 5/2009 | Teicher |
| 7,549,896 B2 | 6/2009 | Zhang et al. |
| 7,553,172 B2 | 6/2009 | Chiu et al. |
| 7,559,805 B1 | 7/2009 | Yi et al. |
| 7,572,153 B2 | 8/2009 | Trenne |
| 7,591,657 B2 | 9/2009 | Teicher |
| 7,594,827 B2 | 9/2009 | Takamoto et al. |
| 7,695,318 B1 | 4/2010 | Wang et al. |
| 7,716,400 B2 | 5/2010 | Raines |
| 7,717,717 B1 | 5/2010 | Lai |
| 7,722,409 B2 | 5/2010 | Takamoto et al. |
| 7,727,027 B2 | 6/2010 | Chiang et al. |
| 7,740,498 B1 | 6/2010 | Orsley |
| 7,841,894 B2 | 11/2010 | Gong et al. |
| 7,865,629 B1 | 1/2011 | Tantos et al. |
| 7,872,873 B2 | 1/2011 | Hiew et al. |
| 7,892,014 B2 | 2/2011 | Amidon et al. |
| 7,918,685 B1 | 4/2011 | Kruckenberg |
| 8,007,309 B2 | 8/2011 | Fan |
| 8,062,073 B1 | 11/2011 | Szczesny et al. |
| 8,162,696 B2 | 4/2012 | Elbaz et al. |
| 8,246,388 B2 | 8/2012 | Chen et al. |
| 8,277,258 B1 | 10/2012 | Huang et al. |
| 8,282,417 B2 | 10/2012 | Xiao |
| 8,287,299 B2 | 10/2012 | Ray et al. |
| 8,342,863 B2 | 1/2013 | Kondo et al. |
| 8,461,465 B2 | 6/2013 | Golko et al. |
| 8,478,913 B2 | 7/2013 | Terlizzi et al. |
| 8,517,751 B1 | 8/2013 | Golko et al. |
| 8,517,766 B2 | 8/2013 | Golko et al. |
| 8,535,075 B1 | 9/2013 | Golko et al. |
| 8,545,269 B2 | 10/2013 | Ore-Yang |
| 8,545,275 B2 * | 10/2013 | Wang et al. ................ 439/693 |
| 8,561,879 B2 | 10/2013 | Jol et al. |
| 8,573,995 B2 | 11/2013 | Golko et al. |
| 8,647,156 B2 | 2/2014 | Golko et al. |
| 8,686,600 B2 | 4/2014 | Terlizzi et al. |
| 8,688,876 B1 | 4/2014 | Fritchman et al. |
| 8,708,745 B2 | 4/2014 | Golko et al. |
| 8,762,605 B2 | 6/2014 | Terlizzi et al. |
| 8,777,666 B2 | 7/2014 | Golko et al. |
| 8,882,524 B2 | 11/2014 | Golko et al. |
| 8,911,260 B2 | 12/2014 | Golko et al. |
| 8,931,962 B2 | 1/2015 | Jol et al. |
| 8,998,632 B2 | 4/2015 | Golko et al. |
| 2001/0046809 A1 | 11/2001 | Chiran et al. |
| 2002/0081880 A1 | 6/2002 | Eichhorn et al. |
| 2003/0012677 A1 | 1/2003 | Senini |
| 2003/0016509 A1 | 1/2003 | Tsukamoto |
| 2003/0207606 A1 | 11/2003 | Ho |
| 2004/0229515 A1 | 11/2004 | Kaneda et al. |
| 2004/0259423 A1 | 12/2004 | Elbaz et al. |
| 2005/0032426 A1 | 2/2005 | Tanaka |
| 2005/0042930 A1 | 2/2005 | Harkabi et al. |
| 2005/0079738 A1 | 4/2005 | Ahn |
| 2005/0085136 A1 | 4/2005 | Zhang |
| 2005/0124217 A1 | 6/2005 | Zhuang et al. |
| 2005/0124218 A1 | 6/2005 | Chen et al. |
| 2005/0124219 A1 | 6/2005 | Chen et al. |
| 2005/0202727 A1 | 9/2005 | Andre et al. |
| 2006/0019545 A1 | 1/2006 | Moriyama et al. |
| 2006/0024997 A1 | 2/2006 | Teicher |
| 2006/0040549 A1 | 2/2006 | Yao |
| 2006/0148300 A1 | 7/2006 | Huang et al. |
| 2006/0216991 A1 | 9/2006 | Boutros |
| 2006/0250764 A1 | 11/2006 | Howarth et al. |
| 2006/0289201 A1 | 12/2006 | Kim et al. |

(56) References Cited

U.S. PATENT DOCUMENTS

| | | |
|---|---|---|
| 2007/0010115 A1 | 1/2007 | Teicher |
| 2007/0010116 A1 | 1/2007 | Teicher |
| 2007/0037452 A1 | 2/2007 | Martin et al. |
| 2007/0049100 A1 | 3/2007 | Tsai |
| 2007/0072442 A1 | 3/2007 | DiFonzo |
| 2007/0082701 A1 | 4/2007 | Seil et al. |
| 2007/0178771 A1 | 8/2007 | Goetz et al. |
| 2007/0202725 A1 | 8/2007 | Teicher |
| 2007/0243726 A1 | 10/2007 | Trenne |
| 2008/0032562 A1 | 2/2008 | McHugh et al. |
| 2008/0067248 A1 | 3/2008 | Hiew et al. |
| 2008/0090465 A1 | 4/2008 | Matsumoto et al. |
| 2008/0119076 A1 | 5/2008 | Teicher |
| 2008/0119291 A1 | 5/2008 | Takamoto et al. |
| 2008/0167828 A1 | 7/2008 | Terlizzi et al. |
| 2008/0200069 A1 | 8/2008 | Hankey et al. |
| 2008/0274633 A1 | 11/2008 | Teicher |
| 2008/0309313 A1 | 12/2008 | Farrar et al. |
| 2009/0004923 A1 | 1/2009 | Tang et al. |
| 2009/0108848 A1 | 4/2009 | Lundquist |
| 2009/0117768 A1 | 5/2009 | Liao |
| 2009/0149049 A1 | 6/2009 | Harkabi et al. |
| 2009/0156027 A1 | 6/2009 | Chen |
| 2009/0180243 A1 | 7/2009 | Lynch et al. |
| 2009/0291576 A1 | 11/2009 | Johansson et al. |
| 2010/0009575 A1 | 1/2010 | Crooijmans et al. |
| 2010/0062656 A1 | 3/2010 | Lynch et al. |
| 2010/0080563 A1 | 4/2010 | DiFonzo et al. |
| 2010/0104126 A1 | 4/2010 | Greene |
| 2010/0118932 A1 | 5/2010 | Luo et al. |
| 2010/0171465 A1 | 7/2010 | Seal et al. |
| 2010/0173533 A1 | 7/2010 | Yang et al. |
| 2010/0221936 A1 | 9/2010 | Zhao et al. |
| 2010/0248544 A1 | 9/2010 | Xu et al. |
| 2010/0254602 A1 | 10/2010 | Yoshino |
| 2010/0254662 A1 | 10/2010 | He et al. |
| 2010/0262744 A1 | 10/2010 | Deva et al. |
| 2010/0267261 A1 | 10/2010 | Lin et al. |
| 2010/0267262 A1 | 10/2010 | Lin et al. |
| 2011/0136381 A1 | 6/2011 | Cho |
| 2011/0159719 A1 | 6/2011 | Takahashi et al. |
| 2011/0201213 A1 | 8/2011 | Dabov et al. |
| 2011/0250786 A1 | 10/2011 | Reid |
| 2011/0263141 A1* | 10/2011 | Ko .................................. 439/83 |
| 2011/0294354 A1 | 12/2011 | Chen et al. |
| 2011/0312200 A1 | 12/2011 | Wang et al. |
| 2012/0028495 A1 | 2/2012 | Su et al. |
| 2012/0149244 A1 | 6/2012 | Zheng et al. |
| 2013/0075149 A1 | 3/2013 | Golko et al. |
| 2013/0078869 A1 | 3/2013 | Golko et al. |
| 2013/0089291 A1 | 4/2013 | Jol et al. |
| 2013/0095701 A1 | 4/2013 | Golko et al. |
| 2013/0095702 A1 | 4/2013 | Golko et al. |
| 2013/0115821 A1 | 5/2013 | Golko et al. |
| 2013/0117470 A1 | 5/2013 | Terlizzi et al. |
| 2013/0122754 A1 | 5/2013 | Golko et al. |
| 2013/0149911 A1 | 6/2013 | Golko et al. |
| 2013/0217253 A1 | 8/2013 | Golko et al. |
| 2013/0244489 A1 | 9/2013 | Terlizzi et al. |
| 2013/0244491 A1 | 9/2013 | Sarwar et al. |
| 2013/0244492 A1 | 9/2013 | Golko et al. |
| 2013/0337698 A1 | 12/2013 | Little et al. |
| 2014/0004741 A1 | 1/2014 | Jol et al. |
| 2014/0057496 A1 | 2/2014 | Siahaan et al. |
| 2014/0068933 A1 | 3/2014 | Brickner et al. |
| 2014/0069709 A1 | 3/2014 | Schmidt et al. |
| 2014/0073170 A1 | 3/2014 | Golko et al. |
| 2014/0073183 A1 | 3/2014 | Golko et al. |
| 2014/0170907 A1 | 6/2014 | Golko et al. |
| 2014/0206209 A1 | 7/2014 | Kamei et al. |
| 2014/0294656 A1 | 10/2014 | Brickner et al. |
| 2014/0329416 A1 | 11/2014 | Golko et al. |

FOREIGN PATENT DOCUMENTS

| | | |
|---|---|---|
| CN | 1905286 A | 1/2007 |
| CN | 101116227 A | 1/2008 |
| CN | 201256225 Y | 6/2009 |
| CN | 201402871 Y | 2/2010 |
| CN | 201509210 U | 6/2010 |
| CN | 101782888 A | 7/2010 |
| CN | 101783466 A | 7/2010 |
| CN | 201533091 U | 7/2010 |
| DE | 196 09 571 A1 | 11/1995 |
| DE | 20 2004 021354 U1 | 9/2007 |
| EP | 81372 A2 | 6/1983 |
| EP | 1684391 A2 | 7/2006 |
| EP | 1717910 A2 | 11/2006 |
| EP | 2169774 A1 | 3/2010 |
| EP | 2373131 A1 | 10/2011 |
| FR | 2138961 | 1/1973 |
| JP | 2 078171 | 3/1990 |
| JP | H06231821 A | 8/1994 |
| JP | H06250103 A | 9/1994 |
| JP | 8321360 A | 12/1996 |
| JP | 2001223057 A | 8/2001 |
| JP | 2003-217728 | 7/2003 |
| JP | 2004-079491 | 3/2004 |
| JP | 2004319371 A | 11/2004 |
| JP | 2008041656 A | 2/2008 |
| JP | 2008508694 A | 3/2008 |
| JP | 2008210674 A | 9/2008 |
| JP | 2009117128 A | 5/2009 |
| JP | 2010067459 A | 3/2010 |
| TW | M318831 U | 9/2007 |
| TW | M350153 U | 2/2009 |
| WO | 0208872 A1 | 1/2002 |
| WO | 2004/097995 A1 | 11/2004 |
| WO | 2005/013436 A1 | 2/2005 |
| WO | 2005124932 A2 | 12/2005 |
| WO | 2006/013553 A2 | 2/2006 |
| WO | 2006/074348 A1 | 12/2006 |
| WO | 2007090069 | 8/2007 |
| WO | 2008/065659 A2 | 6/2008 |
| WO | 2009/069969 A2 | 6/2009 |
| WO | 2009/140992 A1 | 11/2009 |
| WO | 2011043488 A1 | 4/2011 |
| WO | 2011150403 A1 | 12/2011 |
| WO | 2011163256 A1 | 12/2011 |
| WO | 2011163260 A1 | 12/2011 |
| WO | 2012086145 A1 | 6/2012 |
| WO | 2013070767 A1 | 5/2013 |
| WO | 2013082175 A2 | 6/2013 |

OTHER PUBLICATIONS

Hewlett-Packard Company, "An Overview of Current Display Interfaces," Nov. 2007, p. 12, http://isvpatch.external.hp.com/HPPTF2/drvlib/docs/DisplayInterfacesOverview.pdf, 14 pages.

Extended European Search Report, EP App. No. 13165270.3, Mailed Nov. 28, 2014, 12 pages.

Flipper Press Release (Jun. 25, 2012) and Data Sheet: http://www.flipperusb.com/images/flipperUSB-brochure.pdf, http://www.flipperusb.com/images/flipperUSB-brochure.pdf.

International Search Report for International PCT Application No. PCT/US2011/038452, mailed on Oct. 26, 2011, 7 pages.

International Search Report and Written Opinion for International PCT Application No. PCT/US2011/041286, mailed on Oct. 20, 2011, 18 pages.

International Search Report and Written Opinion for International PCT Application No. PCT/US2011/041127, mailed on Dec. 29, 2011, 17 pages.

International Search Report and Written Opinion for International PCT Application No. PCT/US2011/041290, mailed on Nov. 21, 2011, 21 pages.

Non-Final Office Action for U.S. Appl. No. 13/679,991, mailed Apr. 5, 2013, 19 pages.

Non-Final Office Action for U.S. Appl. No. 13/679,992, mailed Apr. 9, 2013, 18 pages.

Notice of Allowance for U.S. Appl. No. 13/679,996, mailed Apr. 12, 2013, 30 pages.

(56) References Cited

OTHER PUBLICATIONS

Notice of Allowance for U.S. Appl. No. 13/720,822, mailed Apr. 8, 2013, 30 pages.

International Preliminary Report on Patentability for International PCT Application No. PCT/US2013/037233, mailed Mar. 19, 2015, 6 pages.

* cited by examiner

PLUG CONNECTOR

CROSS-REFERENCES TO RELATED APPLICATIONS

This application claims the benefit of U.S. Provisional Application Ser. No. 61/698,538 filed Sep. 7, 2012 titled "Plug Connector," the contents of which are hereby incorporated by reference.

BACKGROUND OF THE INVENTION

The present invention generally relates to electrical connectors and in particular to connector modules that can be readily incorporated into electronic devices and docking stations.

A wide variety of electronic devices are available for consumers today. Many of these devices have connectors that facilitate communication with and/or charging of a corresponding device. Typically these connectors are part of a male plug connector and female receptacle connector system in which the plug connector can be inserted into and mated with the receptacle connector so that digital and analog signals can be transferred between the contacts in each connector. More often than not, the female connector in the connector system is included in a host electronic device such as a portable media player, a smart phone, a tablet computer, a laptop computer, a desktop computer or the like. The plug connector in the connector system is often included in an accessory device such as a charging cable, a docking station, an audio sound system or the like. In some instances, however, devices, for example cable adapters, include both receptacle and plug connectors. Also, in some instances, the plug connector/receptacle connector pairing can be part of a large ecosystem of products that includes both host electronic devices and accessory devices designed to work together. Thus, the same general format plug connector can be incorporated into many different accessories, which in turn can be designed to operate with multiple different host devices that include the corresponding receptacle connector.

BRIEF SUMMARY OF THE INVENTION

Embodiments of the invention pertain to plug connectors that can function within an ecosystem of products, many of which are adapted to work with dual orientation (also referred to as "reversible") connectors. Some embodiments of the invention pertain to plug connectors with contacts formed on a single side of the connector that are configured to mate with a receptacle connector in a host device that often mates with a reversible connector. Such a connector may be particularly useful when incorporated into an accessory in which the insertion orientation of the plug connector and the receptacle connector are known. One example of such an accessory is a docking station in which a host electronic device with the receptacle connector is always docked in the same orientation with respect to the docking station.

Plug connectors according to certain embodiments of the present invention have a reduced plug length and thickness as compared to currently available electronic connectors, and a smooth consistent feel when inserted and extracted from a corresponding receptacle connector.

Other embodiments of the invention pertain to plug connectors with external contacts that include a plastic tip integrally formed within a ground ring that is otherwise made from metal. The plastic tip is positioned at the distal tip of the ground ring and helps ensure that if the plug connector comes in contact with a metal enclosure of a host electronic device, the enclosure is less likely to be scratched or otherwise marred or damaged. As one example, consider a user trying to dock a host tablet computer that is relatively heavy in a docking station having a plug connector extending from a docking bay. The tablet computer has a receptacle connector configured to mate with the plug connector but if in the act of docking the tablet computer, the user "misses" so that the receptacle connector and plug connector are not properly aligned, the enclosure of the tablet computer may contact the plug connector, which partly because of the weight of the tablet computer, may result in a scratch or mark on the enclosure if the plug connector has a metal tip.

Still other embodiments of the invention include both a plastic tip and contacts on a single side. Additionally, in some embodiments, the plug connector has a base portion with feet on opposing sides of the plug that each includes a hole that can be used to attach the plug connector to an encasing or other structure of the host electronic device it is incorporated into. The plug connector can extend upwardly away from the base at a predetermined angle such that the contacts are located on the side of the plug connector that forms an acute angle with the base. In one embodiment, the angle of the plug connector with respect to vertical is between 10-25 degrees and in some cases is between 14-15 degrees with respect to vertical.

Still another embodiment of the invention pertains to a plug connector that includes a plug connected to a base and extending away from the base. The plug includes first and second major opposing surfaces along with third and fourth minor opposing surfaces that extend between the first and second major surfaces. A contact region that includes eight sequentially numbered external contacts spaced apart along a first row is formed on the first major surface of the plug.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

As discussed earlier, the invention may apply to a variety of plug connectors which use a variety of different connector technologies. Accordingly, this invention may be used with many electronic devices that mate with a variety of electrical connectors in order to receive and provide power and data. One example of an electronic device that may be used with embodiments of the present invention is shown in FIG. 1.

Figure 1:
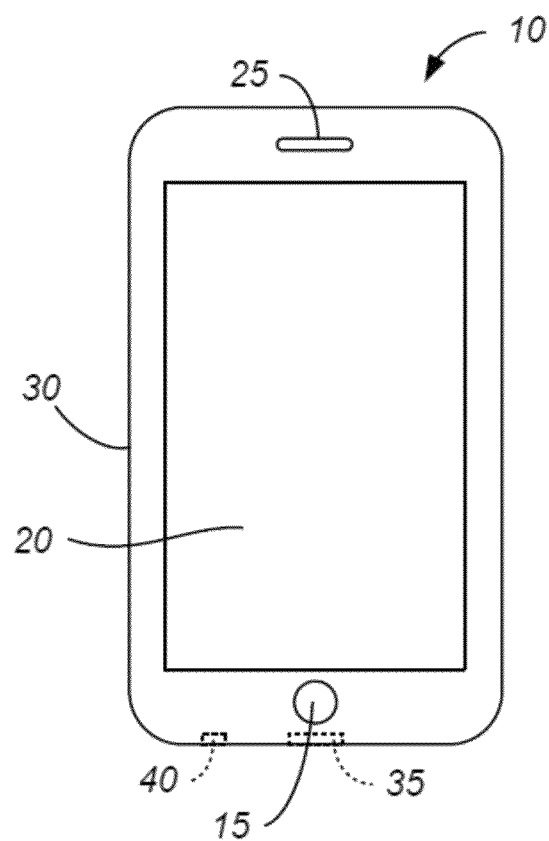
FIG. 1 illustrates a rendering of one particular electronic media device.

FIG. 1 depicts an illustrative rendering of one particular electronic media device 10. Device 10 includes a multipurpose button 15 as an input component, a touch screen display 20 as both an input and output component, and a speaker 25 as an output component, all of which are housed within a device housing 30. Device 10 also includes a primary receptacle connector 35 and an audio plug receptacle 40 within device housing 30. Each of the receptacle connectors 35 and 40 can be positioned within housing 30 such that the cavity of the receptacle connectors into which a corresponding plug connector is inserted is located at an exterior surface of the device housing. In some embodiments, the cavity opens to an exterior side surface of device 10. For simplicity, various internal components, such as the control circuitry, graphics circuitry, bus, memory, storage device and other components are not shown in FIG. 1. Embodiments of the invention disclosed herein are particularly suitable for use with plug connectors that are configured to mate with primary receptacle connector 35, but in some embodiments can also be used with audio plug receptacle 40. Additionally, in some embodiments, electronic media device 10 has only a single receptacle connector 35 that is used to physically interface and connect the device (as opposed to a wireless connection which can also be used) to the other electronic devices.

Although device 10 is described as one particular electronic media device, embodiments of the invention are suitable for use with a multiplicity of electronic devices that include a receptacle connector that corresponds to a plug connector including a frame. For example, any device that receives or transmits audio, video or data signals may be used with the invention. In some instances, embodiments of the invention are particularly well suited for use with portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, desktop computers, as well as tablet (e.g., Apple's iPad devices), laptop or other mobile computers. Some of these devices may be configured to provide audio, video or other data or sensory output.

In order to better appreciate the features and aspects of plug connectors according to the present invention, further context for the invention is provided in the following section by discussing one particular implementation of a plug connector according to the present invention.

Figure 2:
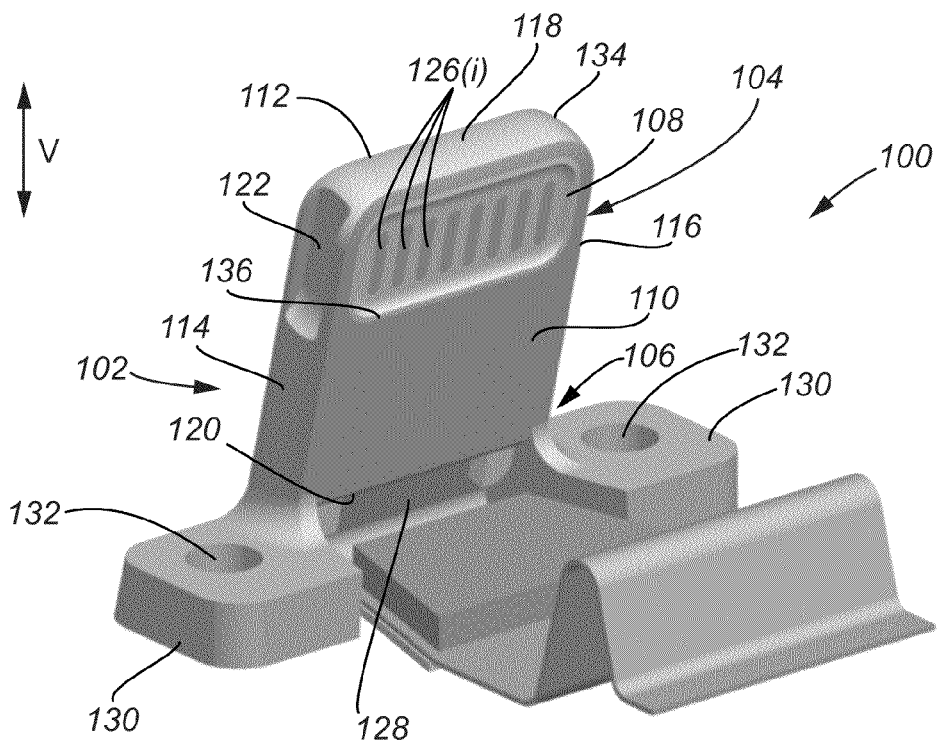
FIG. 2 is a simplified perspective view of a plug connector according to one embodiment of the invention that includes contacts on a single side of the connector that can be incorporated into a docking station or similar accessory.

FIG. 2 is a perspective view depicting an eight contact plug connector assembly 100 that may include a ground ring or frame 102 according to embodiments of the present invention. As shown in FIG. 2, plug connector assembly 100 includes a connector body 104 that extends longitudinally away from a base portion 106. Connector body 104 is sized to be inserted into a corresponding receptacle connector, such as connector 35, during a mating event. Connector body 104 includes a contact region 108 formed on a first major surface 110 that is opposite second major surface 112 of connector body 104. Surfaces 110, 112 extend from the base portion 106 to a distal tip 118 of connector body 104. When connector body 104 is inserted into a corresponding receptacle connector, major surfaces 110, 112 abut a housing of the receptacle connector or host device into which the receptacle connector is incorporated.

Connector body 104 includes third and fourth opposing minor surfaces 114, 116 that extend between the first and second major surfaces 110, 112. Minor surfaces 114, 116 extend from the base portion 106 to distal tip 118, forming the side walls of connector body 104. When connector body 104 is inserted into a corresponding receptacle connector, minor surfaces 114, 116 may abut inner walls of a housing of a corresponding receptacle connector of a host device. In some embodiments, connector body 104 is between 4 and 7 mm wide, between 1 and 2 mm thick and has an insertion depth (the distance from distal tip 118 to proximal end 120) between 5 and 10 mm. In one particular embodiment, connector body 104 is 6.7 mm wide in the width dimension, 1.5 mm thick in the height dimension and has an insertion depth (the distance from distal tip 118 to proximal end 120) in the length dimension of 6.6 mm. In other embodiments, body 104 has the same 6.7 mm width and 1.5 mm height but has a length of, for example, between 6.5-8.0 mm.

In some embodiments, connector body 104 extends away from base portion 106 at a predetermined angle. In certain embodiments, connector body 104 extends upwardly from base portion 106 at an angle of between approximately 10 and 25 degrees, and in some cases at an angle between approximately 14-15 degrees, with respect to vertical V. In other embodiments, body 104 extends perpendicularly away from base 106.

According to certain embodiments of the invention, the structure and shape of connector body 104 is defined by ground ring 102, which can be made from stainless steel or another hard conductive material. Connector body 104 includes an opening 136 on first major surface 112 that makes up contact region 108. As shown in FIG. 2, opening 136 may be rectangular with rounded corners. In other embodiments, opening 136 may be otherwise shaped, e.g., the opening may be triangular, circular or irregularly shaped.

In some embodiments, base portion 106 of plug connector assembly 100 has a pair of feet, with one foot 130 located on either side of connector body 104. Each foot 130 has a hole or cavity 132 passing through the foot. Holes 132 may be threaded, which allows the plug connector assembly 100 to be fastened to a device, such as a docking station or some other surface, as desired by using screws or other fastening devices.

In certain embodiments, distal tip 118 of connector body 104 may have a curved distal end or leading edge 134. The leading edge may be rounded for approximately 1 mm of its length at each of its ends, and in some embodiments is rounded for between 0.5 mm and 1.5 mm at each end. Rounded leading edge 134 may make it easier to insert connector body 104 into a corresponding receptacle connector when the connector body is rotated off axis, that is, when the connector body is inserted at an incorrect pitch angle.

Contact region 108 includes a plurality of external contacts, such as contacts 126(1) . . . 126(8) (labeled in FIG. 2 as

126(i)). Contacts 126(i) can be made from copper, nickel, brass, stainless steel, a metal alloy or any other appropriate conductive material or combination of conductive materials. In some embodiments, contacts 126(i) can be printed using techniques similar to those used to print contacts on printed circuit boards. In some other embodiments, contacts 126(i) can be stamped from a lead frame, positioned within contact region 108 and surrounded by dielectric material.

As shown in FIG. 2, plug connector assembly 100 is particularly well suited for inclusion in a docking station, clock radio, or other device in which a host electronic device having a corresponding plug connector will always connect in a particular orientation. Thus, connector body 104 according to certain embodiments and as shown in FIG. 2 only includes contacts 126(i) on a single surface of the connector as opposed to both major surfaces.

As shown in FIG. 2, eight external contacts 126(1) . . . 126(8) are spaced apart along a single row in contact region 108 of first major surface 110. Contacts 126(1) . . . 126(8) can be used to carry a wide variety of signals including digital signals and analog signals as well as power and ground as discussed below. In some embodiments, contact region 108 is located towards distal tip 118 of connector body 104 and/or on the minor surfaces 114, 116 of connector body 104. Embodiments that employ ground contacts at one or more positions along the minor surfaces and/or tip surfaces of connector body 104 instead of within the contact region may enable the overall footprint of connector plug to be smaller than a similar connector that includes ground contacts within the contact region. In other embodiments, contact region 108 may occupy a different location or even the entirety of connector body 104.

The contacts may be spaced apart along a single or multiple rows. Although eight external contacts are shown in FIG. 2, contact region 108 may include any number of external contacts, from one to twenty or more arranged in a variety of different patterns. In some embodiments, individual contacts may be sized differently. This may be particularly useful, for example, where one or more contacts are dedicated to carry high power or high current.

Contacts 126(1) . . . 126(8) can be used to carry a wide variety of signals including digital signals and analog signals as well as power and ground as previously discussed. In one embodiment, each contact 126(1) . . . 126(8) have an elongated contact surface. In one embodiment, the overall width of each contact is less than 1.0 mm at the surface, and in another embodiment the width is between 0.75 mm and 0.25 mm. In one particular embodiment, a length of each contact 126(i) is at least 3 times as long at the surface as its width, and in another embodiment a length of each individual contact 126(i) is at least 5 times as long at the surface as its width.

Examples of analog contacts that may be included in contact region 108 include contacts for separate left and right channels for both audio out and audio in signals as well as contacts for video signals, such as RGB video signals, YPbPr component video signals and others. Similarly, many different types of digital signals can be carried by contacts 126(i) in contact region 108 including data signals such as USB signals (including USB 1.0, 2.0 and 3.0), FireWire (also referred to as IEEE 1394) signals, UART signals, Thunderbolt signals, SATA signals and/or any other type of high speed serial interface signal or other type of data signal. Digital signals within contact region 108 may also include signals for digital video such as DVI signals, HDMI signals and Display Port signals, as well as other digital signals that perform functions that enable the detection and identification of devices or accessories to the plug connector.

In some embodiments, the sequentially numbered contacts 126(1) . . . 126(8) include first and second contacts designated for data signals at locations 2 and 3, a power contact designated for power at location 5, third and fourth contacts designated for data signals at locations 6 and 7 and a ground contact at location 126(1). In some embodiments connector body 104 further includes an accessory power contact at location 4 and an ID contact at location 8.

Power contact 106(5) may carry signals of any voltage and, as an example, may carry signals between 2-30 volts. In some embodiments, multiple power contacts are included in contact region 108 to carry power signals of different voltages levels that can be used for different purposes. For example, the accessory power contact may deliver low current power at 3.3 volts that can be used to power accessory devices connected to plug connector assembly 100 can be included in contact region 108, while power contact 106(5) may deliver high current power at 5 volts for charging portable media devices coupled to plug connector assembly 100. In some embodiments, one or more power contacts within the region can be larger than other contacts to more efficiently enable the larger contacts to carry high power and/or high current. In other embodiments, multiple contacts can be electrically coupled together to provide one or more "larger contacts" for carrying high power and/or high current.

Accessory power contact 126(4) can be used for an accessory power signal that provides power from the host to an accessory. The accessory power signal is typically a lower voltage signal than the power in signal received over contact 106(5), for example, 3.3 volts as compared to 5 volts or higher. The accessory ID contact provides a communication channel that enables the host device to authenticate the accessory and enables the accessory to communicate information to the host device about the accessory's capabilities such as the communication interface that is used for each of pair of the data contacts.

Data contacts 126(2), 126(3), 126(6) and 126(7) can be used to enable communication between the host and accessory using one or more of several different communication protocols. In some embodiments, data contacts 126(2) and 126(3) operate as a first pair of data contacts and data contacts 126(6), 126(7) operate as a second pair of data contacts allowing two different serial communication interfaces to be implemented over the data contacts as discussed below. In one embodiment, data contacts 126(2), 126(3) are positioned between the accessory power contact and ground, while data contacts 126(6) and 126(7) are positioned between the power contact and the accessory ID contact. The data contacts can be high speed data contacts that operate at rate that is at least two orders of magnitude faster than any signals sent over the accessory ID contact which makes the accessory ID signal look essentially like a DC signal to the high speed data lines. The accessory power, ground and charging power contacts are all DC contacts. Thus, positioning the data contacts as just described improves signal integrity by sandwiching the data contacts between contacts designated for either DC signals or essentially DC signals.

Figure 3:
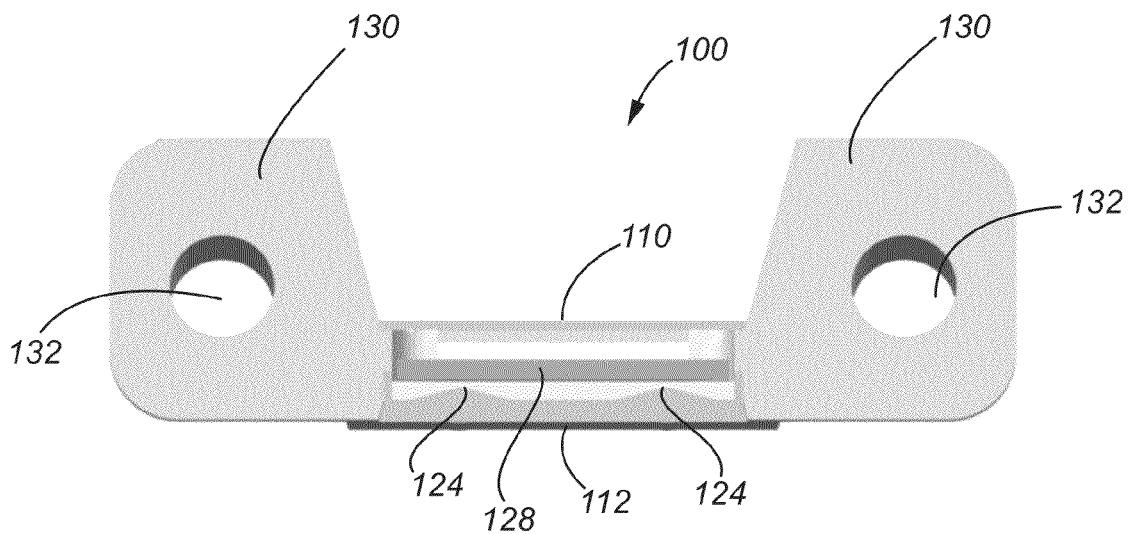
FIG. 3 is a simplified bottom plan view of the plug connector in FIG. 2.

As shown in FIGS. 2-3, a substrate 128, such as a printed circuit board (PCB), is housed within connector body 104. As shown in FIGS. 2-3, a portion of substrate 128 extends past proximal end 120 of connector body 104. Substrate 128 includes a plurality of contact bonding pads (not shown) that can correspond in number to the plurality of contacts 126(i) and that are positioned directly beneath contacts 126(i) in contact region 108. Substrate 128 also includes one or more electronic components, such as integrated circuits, a plurality of conductor bonding pads and ground pads. Each conductor bonding pad can be connected to one or more contact bonding pads by electrical traces that run along substrate 128 (not shown).

FIG. 3 is a bottom plan view of plug connector assembly 100 illustrating how the substrate 128 is positioned with respect to connector body 104. As shown in FIG. 3, second major surface 112 of connector body 104 includes internal ribs 124. Ribs 124 help center substrate 128, which rests on top of ribs 124. Specifically, because contacts only exist on one surface of the substrate (such as first major surface 110), ribs 124 help bias substrate 124 (and thus the contacts bonding pads included on substrate 124) into proper position.

As illustrated, minor surfaces 114, 116 of connector body 104 may include cutouts 122 that align with a feature on a corresponding receptacle connector. Cutouts 122 may engage with corresponding features disposed in a receptacle connector of a host device and aid in holding connector body within the receptacle connector. Cutouts can also be located at a variety of positions along the connector body 104 including along the minor surfaces 114, 116 and/or distal tip 118 and/or bottom surfaces of the connector body. In some embodiments, cutouts 122 are not utilized.

Figure 4:
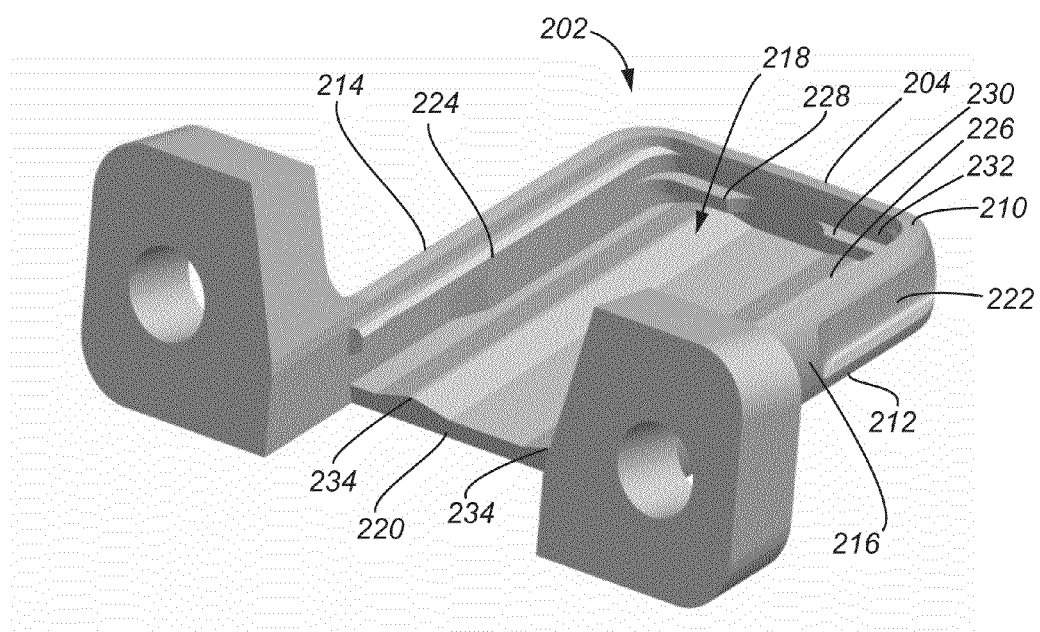
FIG. 4 is a simplified perspective view of a metal frame that makes up a portion of a plug connector shown in FIG. 2 without the front side of the frame.

FIG. 4 illustrates a ground ring 202 according to an embodiment of the present invention that in some embodiments corresponds to ground ring 102 shown in FIG. 2. In some embodiments, ground ring 202 can be made from stainless steel or another hard conductive material. As shown in FIG. 2, ground ring 202 comprises a first major surface 210 and a second opposing major surface 212. Ground ring also includes opposing minor surfaces 214, 216. First major surface 210 includes a cavity 218 that extends generally from a proximal end 220 of ground ring 202 to a distal end 204 in length and the width of cavity 218 is defined by the distance between the two minor surfaces 214, 216. When ground ring 202 is inserted into a corresponding receptacle connector, surfaces 210, 212, 214, 216 may abut inner walls of a housing of a corresponding receptacle connector of a host device. In one particular embodiment, ground ring 202 is 6.7 mm wide in the width dimension, 1.5 mm thick in the height dimension and has an insertion depth (the distance from distal end 204 to proximal end 220) in the length dimension of between 6.5-8.0 mm.

Ground ring 202 may optionally include cutouts 222 that are formed as curved recesses on surfaces 214, 216, respectively, proximate distal end 204. If utilized, in some embodiments these cutouts may be retention features (e.g., curved recesses or pockets) that engage with corresponding features disposed in a receptacle connector of a host device and aid in holding connector body within the receptacle connector. In other embodiments, cutouts 222 are elongated slots that extend from distal end 204 along a portion of the length of each side surface 214, 216. The slots may align with retention features in the receptacle connector but not be a retention feature themselves.

Cavity 218 includes ledges 224, 226 that extend from proximal end 220 toward distal end 204 of ground ring 202. In some embodiments, ledges 224, 226 are undercuts that help retain a plastic cover (not shown) in position. In particular, after metal ground ring 202 has been formed and after the appropriate substrate has been positioned within ground ring 202, plastic may be introduced by injection molding to form a cover that is flush with first major surface 210 to cover the entire face of cavity 218. In this way, contacts positioned within ground ring 202 before the plastic is introduced become embedded within the plastic cover after the plastic is introduced. Ledges 224, 226 interlock with the injection-molded plastic so that the plastic cover does not detach from metal ground ring 202.

Also shown in FIG. 4 are interlocks 228, 230, which may further define cavity 218 of ground ring 202. Interlocks 228, 230 may be disposed on inner end surface 232 and may assist in preventing material overmolded around contacts assembled with ground ring 202 from dislodging and moving in the height dimension. Accordingly, interlocks may prevent displacement of the overmolded contact assemblies when forces are applied to the contacts assemblies in the direction of the height dimension. These forces may be caused by users pressing down on the contact assemblies or otherwise subjecting the contact assemblies to forces, e.g., dropping or hitting the contact assemblies of the plug connector.

FIG. 4 also illustrates internal ribs 234 that help center substrate (not pictured) within ground ring 202 as explained above.

Figures 5A, 5B, 5C, 5D:
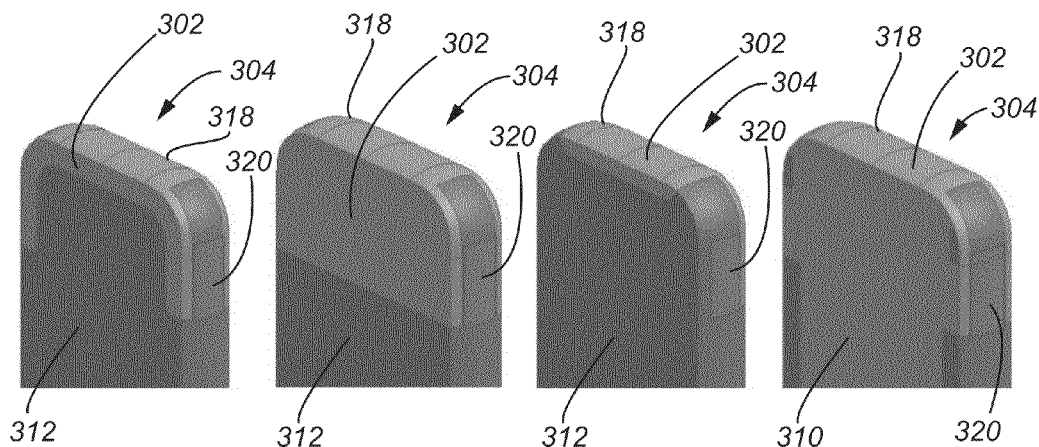
FIGS. 5-6 are various simplified views of a plug connector having a plastic tip according to embodiments of the invention.
Figures 5E, 5F:
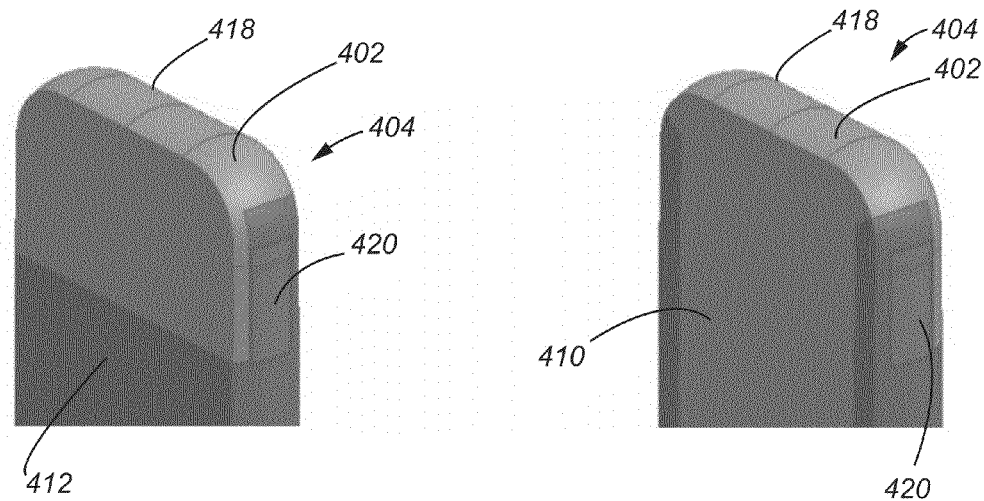
Figure 6:
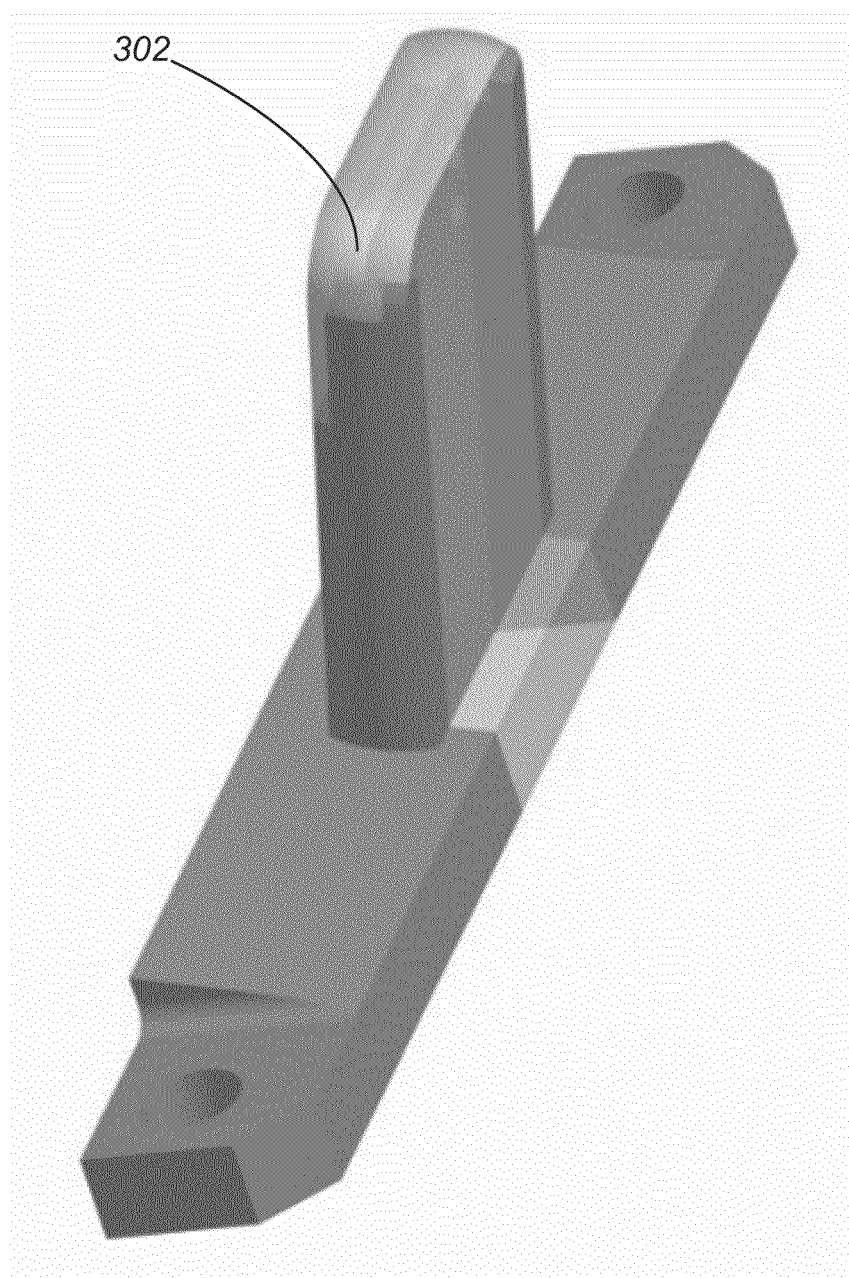

FIGS. 5 and 6 pertain to other embodiments of the invention that include a plastic tip at the distal end of the connector. FIGS. 5A-5F illustrates a connector body 304 and a connector body 404. Connector body 304 has a first major surface 310 and an opposing second major surface 312. Similarly, connector body 404 has a first major surface 410 and an opposing second major surface 412. Connector bodies 304 and 404 each include a tip portion 302 that is formed from a plastic material instead of metal This can be done, for example, by forming a ground ring without a metal tip and adding tip portion 302 in an injection molding process that flows injection molding material into the frame using an appropriately shaped mold. In this way, plastic tip portion may be integral with the ground ring. The injection molding process may also fill in spaces between the ground ring and substrate and between individual contacts in contacts 106(1) . . . 106(8) and the ground ring.

FIGS. 5A-5C disclose various configurations of tip portion 302 disposed along distal tip 318 and, in some embodiments, at least partially along second major surface 312. FIG. 5D illustrates one of many configurations of tip portion 302 as it extends along first major surface 310. In some embodiments, tip portion 302 does not extend along first major surface 310 or second major surface 312 at all and instead is disposed only along distal tip 318 of connector body 304. In some variations, connector body 304 also includes metal regions 320 that, while not shown in the figures, can correspond to recesses that engage with retention features of the corresponding receptacle connector and/or provide a side ground contact to help ensure proper functioning of connector body 304. Although not pictured, first major surface 310 may include contacts, such as contacts 126(i) described above.

FIG. 5E discloses one non-limiting configuration of tip portion 402 along distal tip 418 and second major surface 412 of connector body 404, while FIG. 5F shows first major surface 410 of the embodiment shown in FIG. 5E. In this particular embodiment, tip portion 402 is disposed along distal tip 418 and extends partially along first major surface 410 and second major surface 412. Connector body 404 also includes metal regions 420 that are similar to regions 320. Although not pictured, first major surface 410 may include contacts such as contacts 126(i) described above.

Tip portions 302 and 402 may be any size and any configuration and may extend in any direction and distance along distal tip and along one or more of the major surfaces. In some embodiments, the tip portion extends only partially along the one or more major surfaces, while in other embodiments, the tip portion extends further away from the distal tip along the one or more major surfaces. In some embodiments, the tip portion only extends along the distal tip and does not extend along either of the major surfaces. In some embodiments, the tip portion extends at least partially along the minor surfaces as well as the distal tip and/or the major surfaces.

Plastic tip portions 302 or 402 may be integrally formed within ground ring, which as described is otherwise made from metal. Because the plastic tip portion is positioned at the distal tip 318, 418 of the ground ring, it helps ensure that if the connector body comes in contact with a metal enclosure of a host electronic device, the enclosure is less likely to be scratched or otherwise marred or damaged.

In some versions of the embodiments discussed above with respect to FIGS. 2-6, the plug connector according to the invention may have a form factor that enables mating with receptacle connector 140 disclosed in concurrently filed U.S. patent application Ser. No. 13/607,366, which is herein incorporated by reference in its entirety, or with a receptacle connector such as receptacle connector 35 in FIG. 1.

Embodiments of the present invention may provide a plug connector ground ring or frame that may be easily manufactured. For example, techniques such as a metal injection modeling (MIM) in combination with machining and finishing operations may be used to form frames or ground rings of the invention.

With one exemplary, non-limiting process, a method of manufacture includes three general steps. At the first step, a MIM process is performed to form a metal part. At the second step, select surfaces of the metal part are machined. Lastly, at the third step, finishing operations are performed on the metal part to complete the manufacture of a ground ring or frame. These steps may be used to form embodiments of connector bodies 104, 204, 304, and 404 described above.

In some embodiments, sub-steps are performed. At a first sub-step, a green part or green frame is molded. To produce the green part, a MIM feedstock is blended and injected into a molding machine in molten form. Once the liquefied feedstock cools, it may be de-molded in the molding machine. The feedstock may include a variety of elements chosen to produce a metal part with particular characteristics. In one embodiment, a feedstock for use with the invention may include atomized metal powder, a thermoplastic polymer and wax based plastic. The atomized metal powder may be an atomized steel powder, e.g., atomized steel 630 powder. The thermoplastic polymer may provide the plastic binding agent for the MIM process and the wax based plastic may provide the wax binding agent for the MIM process.

At a second sub-step, the binders are removed (de-binded) from the green part to produce a brown part or brown frame. The binding material may be removed using heat, solvents (e.g., nitric acid), and/or other methods or a combination thereof.

At a third sub-step, the brown part is sintered to produce a MIM part or frame and the MIM process is completed. The sintering process includes subjecting the brown part to temperatures that cause the atomized metal powders to bind together and form the MIM part or frame.

Although a particular method of manufacturing a frame according to the invention is discussed above, embodiments of the invention may include manufacturing the frame by other methods, including pressed powder sintering, investment casting, and simply computer numerical control (CNC) machining.

As will be understood by those skilled in the art, the present invention may be embodied in many other specific forms without departing from the essential characteristics thereof. Also, while a number of specific embodiments were disclosed with specific features, a person of skill in the art will recognize instances where the features of one embodiment can be combined with the features of another embodiment. Also, those skilled in the art will recognize, or be able to ascertain using no more than routine experimentation, many equivalents to the specific embodiments of the inventions described herein. Such equivalents are intended to be encompassed by the following claims.

What is claimed is:

1. A plug connector assembly comprising:
   a base comprising a first foot extending from a first end of the base and a second foot extending from an opposite end of the base;
   a connector body extending upwardly from the base, the connector body comprising front and rear opposing outside surfaces; and
   a plurality of external contacts exposed only on the front outside surface of the connector body.

2. The plug connector assembly set forth in claim 1 wherein the plurality of contacts comprises a pair of data contacts.

3. The plug connector assembly set forth in claim 1 wherein the connector body comprises one or more ground contacts.

4. The plug connector assembly set forth in claim 1 wherein the structure and shape of the connector body comprises a metal ground ring.

5. The plug connector assembly set forth in claim 1 further comprising a first side wall extending upwardly from the first end of the base and between the front and rear surfaces and a second side wall extending upwardly from the opposite end of the base and between the front and rear surfaces.

6. The plug connector assembly set forth in claim 5 further comprising a cutout adapted to engage with a retention feature on a corresponding receptacle connector.

7. The plug connector assembly set forth in claim 6, wherein the cutout comprises a first cutout formed on the first side wall and a second cutout formed on the second side wall.

8. The plug connector assembly set forth in claim 1 wherein the plurality of contacts includes a power contact.

9. The plug connector assembly set forth in claim 5, further comprising a first channel in the first side wall and a second channel in the second side wall to facilitate placement in a corresponding receptacle connector.

10. The plug connector assembly set forth in claim 1, further comprising a threaded cavity located and passing through each of the first and second feet.

11. The plug connector assembly set forth in claim 1, wherein the distal end of the connector body comprises plastic.

12. The plug connector assembly set forth in claim 11, wherein the distal end of the connector body comprises a molded plastic leading edge.

13. The plug connector assembly set forth in claim 1, wherein the connector body extends upwardly from the base at a predetermined angle between approximately 10 degrees and approximately 25 degrees from vertical.

14. The plug connector assembly set forth in claim 1, wherein the connector body extends upwardly from the base at a predetermined angle between approximately 14 degrees and approximately 15 degrees from vertical.

15. The plug connector assembly set forth in claim 1, wherein a cavity of the connector body comprises retention ledges.

16. The plug connector assembly set forth in claim 1, wherein the rear surface comprises one or more ribs adjacent to a substrate containing the plurality of external contacts.

17. An electrical connector assembly comprising:
   a frame made of a hard conductive material and comprising two major surfaces, two minor surfaces, and a distal end, wherein the frame extends upwardly from a base portion of the assembly at an angle of approximately 10 degrees to approximately 25 degrees from vertical;

a plastic tip integrally formed with the frame and that extends at least partially across the distal end of the frame; and a plurality of external contacts formed on one of the two major surfaces of the frame.

18. The assembly set forth in claim 17 wherein the plurality of external contacts are formed on only one of the two major surfaces.

19. The assembly set forth in claim 17 wherein the base portion further comprises two feet that each extend in opposite directions from a proximal end of the ground ring.

20. The assembly set forth in claim 17 wherein each of the feet comprises a cavity that extends through each foot.

21. The assembly set forth in claim 17 wherein the base portion extends upwardly from the base portion at an angle between approximately 14 degrees and approximately 15 degrees from the vertical.

* * * * *